Jan. 18, 1966    R. G. FERRIS    3,229,986
FLAIL TYPE MATERIAL SPREADER WITH DIRIGIBLE WHEELS
Filed March 29, 1965    2 Sheets-Sheet 1
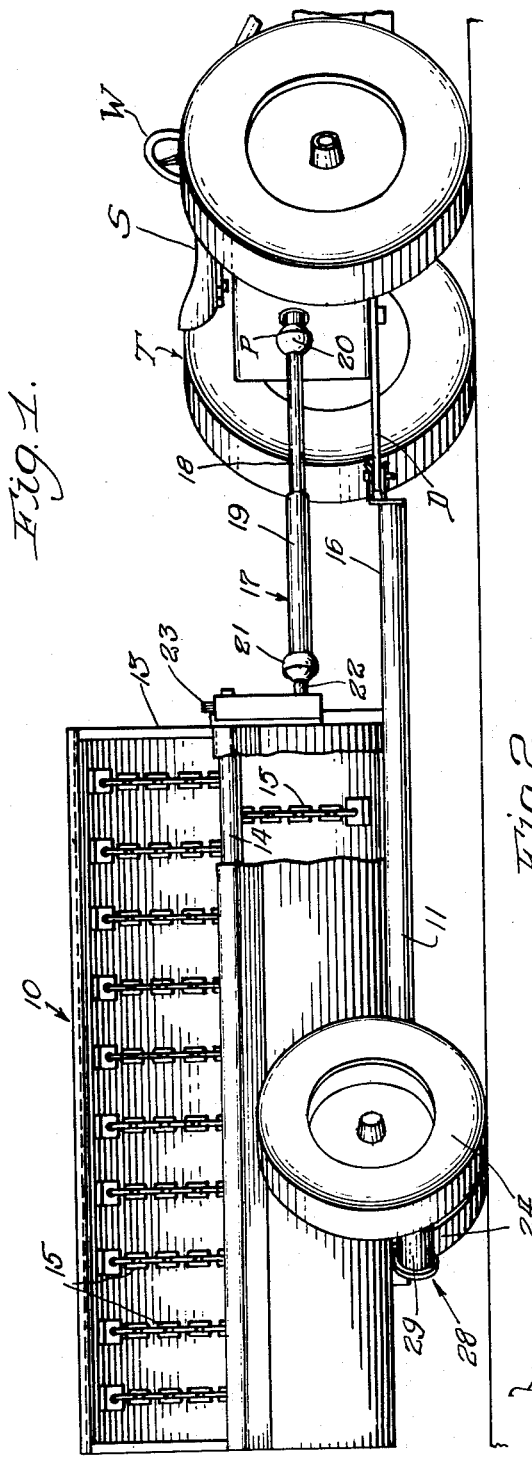
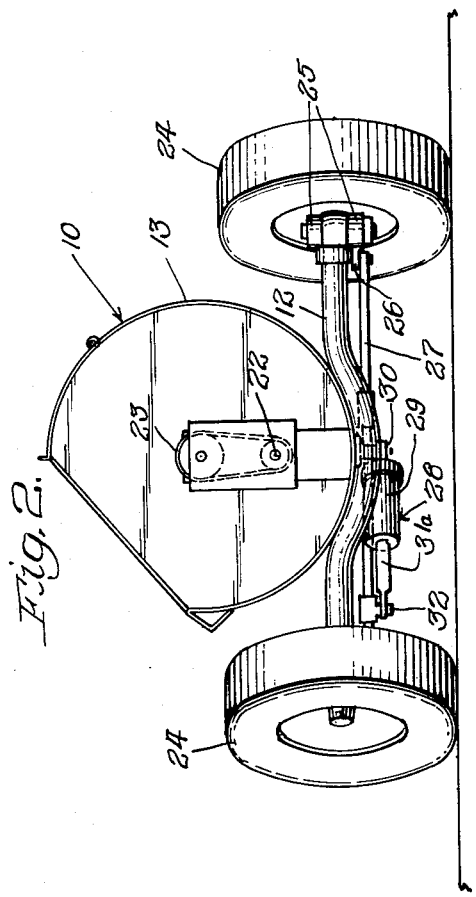
Inventor:
Robert G. Ferris,
By Hofgren, Wegner, Allen,
Stellman & McCord Attys.

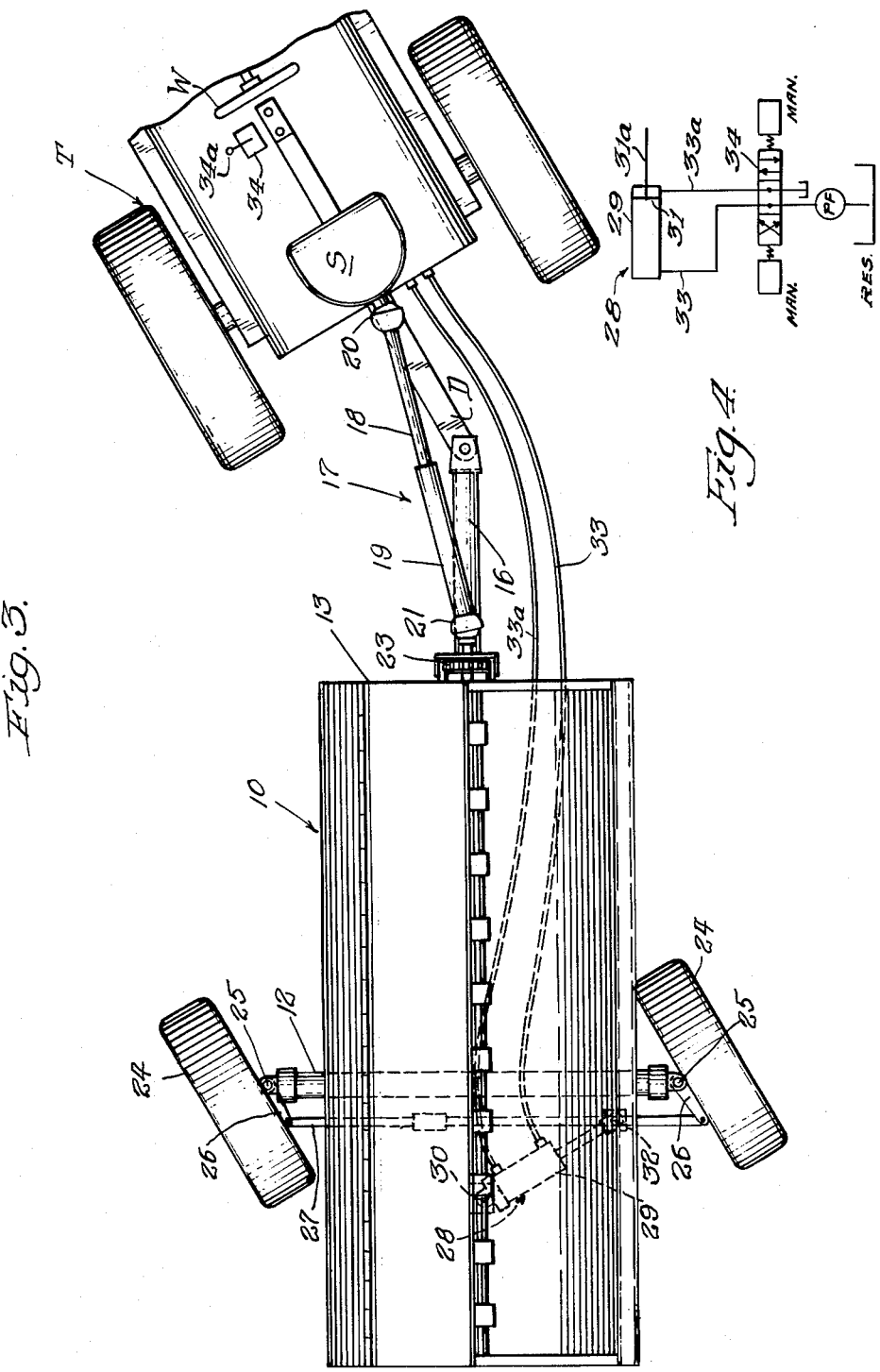

3,229,986
FLAIL TYPE MATERIAL SPREADER WITH DIRIGIBLE WHEELS
Robert G. Ferris, Harvard, Ill., assignor to Starline, Inc., a corporation of Illinois
Filed Mar. 29, 1965, Ser. No. 443,294
2 Claims. (Cl. 275—3)

This invention relates to a flail type material spreader having dirigible wheels, and constitutes an improvement upon spreader structures of the type disclosed and claimed in Elwick Patent 2,886,332. The application is a continuation-in-part of my copending application 281,908, filed May 21, 1963.

Flail type material spreaders have a generally cylindrical tank-like material container which may be drawn behind a tractor or other prime mover, either with the unloader shaft generally parallel to the line of travel as illustrated in the drawings of the Elwick patent, or transverse to the line of travel as illustrated in Harris Patent 2,886,333. While either construction presents some problems of maneuverability of a tractor and spreader, the problem is somewhat greater with the longitudinally oriented container, especially if spreader capacity is increased by elongating the container.

The problem of maneuverability is particularly difficult when the spreader must be positioned for loading. For example, where the spreader is to be loaded directly from the elevated end of a barn gutter cleaner that extends out a few feet from the side wall of the barn, the location of a silo or other structure which is associated with the barn may make it extremely difficult to maneuver the spreader into a proper position at right angles to the elevator. Likewise, many dairy farms today have a low-cost shed which provides shelter for cattle, and which is most conveniently cleaned by a tractor using a front end loader. It is often a difficult job to maneuver a spreader into position in or at the side of such a shed and leave room for operation of the tractor and front end loader within the shed.

A great advantage of the longitudinally oriented spreader over that which is tranversely oriented is that, except for the problem of maneuverability, there is almost no limit on the length of the container. For example, although a longitudinally oriented spreader may be given a material capacity of about nine tons by extending the length to fifteen feet, the unit is very difficult to maneuver through a gate behind a tractor. Likewise it is often desirable for a farmer to pull the spreader to a remote field along a highway, and in most cases it is necessary to turn the tractor and spreader off the highway over a relatively narrow culvert and through a gate into the field. It is quite obvious that the need for making such a maneuever can greatly restrict the over-all length of the spreader.

In accordance with the present invention, the spreader is provided with dirigible wheels which may be turned by an operator on the tractor so as to provide a unit which is much more maneuverable when being towed by a tractor. Thus, for example, a spreader with dirigible wheels may be positioned close to a loading point, and by turning the wheels in the proper direction it may be caused to move transversely into unloading position with very little forward movement. Likewise, the unit may be caused to follow more closely the exact line of travel of the tractor in going around a right angle corner. This, of course, simplifies the problem of moving a relatively long unit around a corner and across a narrow culvert into a field.

A supplemental advantage in the use of dirigible wheels upon a flail type spreader is that it permits the spreader body to be oriented at an angle to the line of travel of the tractor, so as to protect the tractor operator from the discharging material when the device is being operated with a tail wind. Harriott Patent 2,900,193 achieves the latter result by shifting the container angularly on the supporting frame without turning the wheels; but this produces certain complications in the operation of a device in accordance with Harriott patent that are quite serious.

The invention is illustrated in a preferred embodiment in the accompanying drawings in which:

FIG. 1 is a side elevational view of a dirigible wheel flail type spreader drawn behind a tractor, a part of the spreader side wall being broken away;

FIG. 2 is a front elevational view with the hitch tongue removed for clarity of illustration;

FIG. 3 is a top plan view of the device of the invention hitched to a tractor; and FIG. 4 is a hydraulic diagram of the steering system.

Referring to the drawings in greater detail, a spreader indicated generally at 10, has a frame 11 that includes an axle 12; and a generally cylindrical container 13 is carried upon the frame. An unloader shaft 14 provided with flexible flails 15 extends the length of the container 13. The frame extends forwardly of the container to provide a hitch tongue 16 by means of which the spreader may be connected to the draw bar D of a tractor T having a steering wheel W by which the tractor front wheels (not shown) are steered in the usual way, and the unloader shaft 14 is driven from the power take-off P of the tractor through conventional drive connecting means, indicated generally at 17, which includes a pair of telescoping drive tubes 18 and 19, a universal joint 20 which connects the tube 18 to the power take-off P, and a universal joint 21 which connects the drive tube 19 to a stub shaft 22 from which power is transmitted to the unloader shaft 14 by sprocket and chain means 23.

As best seen in FIGS. 2 and 3, a pair of dirigible wheels 24 are pivoted at the ends of axle 12 on pintle assemblies 25, and steering arms 26 connected to the pintle assemblies are joined by a tie bar 27 in a manner which is conventional for dirigible wheel devices.

Power for turning the dirigible wheels 24 on the pintles 25 is derived from a hydraulic cylinder and piston unit, indicated generally at 28, the cylinder 29 of which is pivotally connected to the frame 11 at 30, and the piston 31 of which has a piston rod 31d of which is pivotally connected to the tie bar at 32. Hydraulic lines 33 and 33a connect the cylinder 29 with the tractor hydraulic system, and a 4-way, manual spring centered hydraulic control valve 34 accessible to an operator on the tractor seat S permits the wheels 24 to be turned at the will of an operator on the tractor independently of the movement of the front wheels of the tractor by the steering wheel W.

As seen in FIG. 4, a single end rod 31a and the cylinder and piston unit 28 is of the common double acting type with a single end rod 31a and the hydraulic lines 33 and 33a connected into the cylinder 29 on opposite sides of the piston 31. Valve 34 has a manual control handle 34a that has a neutral position at which no fluid moves in the lines 33 and 33a, a first power position in which fluid enters the cylinder through the line 33 and is bled off through the line 33a, and a second power position in which fluid enters through 33a and bleeds through 33. The pump is part of the tractor hydraulic system, as is the reservoir.

In FIG. 3 the wheels 24 are in their maximum "left turn" position, and it is apparent that the valve was placed in its second power position to move the wheels to this position. By moving the valve momentarily to the first power position the wheels may be caused to start moving toward center position, and then may be caused to stop at any desired point by returning the valve control handle to neutral. Thus the wheels may be retained at any desired angle to the body of the spreader.

A great advantage of the dirigible wheel spreader is that it may be positioned with the container at a rather substantial angle to the line of travel of the tractor T without any excessive angles through the universal joints 20 and 21 of the drive connection 17. There is a very restricted angle through which a universal joint may drive without excessive loss of power and speed at the drive shaft, and the structure of the present invention permits the spreader container 13 to be disposed at a 30° angle with respect to the line of travel of the tractor, as seen in FIG. 3, while maintaining angles of only 15° at the universal joints 20 and 21. Preferably the hitch tongue 16 is pinned to the tractor draw bar D at a point which is substantially midway between the universal joints 20 and 21 so that each of the angles through the two universal joints is as small as possible. Maintenance of minimum angles at the universal joints is of great importance, because universal joint torque characteristics begin to vary when the angle through the joint goes above about 8°, and the greater the angle through the universal joint the worse the application of torque therethrough. It is particularly important to avoid such torque variations in a flail type material spreader, since proper extension of the flails requires a certain minimum speed of the unloader shaft which cannot be reached if there is too much loss through the universal joints.

FIG. 1 of the drawings shows that the stub shaft 22 at the front of the spreader 10 is substantially in the same horizontal plane with the tractor power take-off P so that, except when going over bumps or ridges, drive through the universal joints 20 and 21 is free of any angle through the joints in a vertical plane.

The foregoing detailed description is given for clearness of understanding only and no unnecessary limitations are to be understood therefrom, as some modifications will be obvious to those skilled in the art.

I claim:

1. A material spreader adapted for towing by a prime mover having a drawbar and a power take-off, said spreader comprising, in combination: a frame including an axle; a pair of dirigible wheels on the ends of said axle; hitch means secured to the frame for trailing the spreader behind a prime mover; an upright pivot at the front of the hitch means for connection to a drawbar of a prime mover; a generally cylindrical container on said frame, said container having end walls and arcuate bottom and side walls joining said end walls, there being a discharge opening in an upper quadrant of said container for discharge of material over a side wall of the container; an unloader shaft at the axis of the cylindrical container; a plurality of flexible flails on said shaft; steering means for turning said dirigible wheels to vary the angular disposition of the spreader with respect to the line of travel of the prime mover, said steering means including a tie bar and a two way powered hydraulic cylinder and piston unit pivotally connected to the tie bar and to a fixed portion of the spreader; means for operating the hydraulic unit from the prime mover at the will of an operator and independently of the steering of the prime mover, said operating means including a manual valve which has two operative positions and a neutral position, said valve in neutral position retaining the piston in any attained position to lock the wheels at any desired angle to the spreader container; means for driving said shaft including a forwardly extending stub shaft substantially in the same horizontal plane with a prime mover power take-off; and a pair of telescoping tubes with a rear universal joint connected to the stub shaft and a forward universal joint for attachment to the prime mover power take-off, the pivot on the hitch means being approximately midway between said universal joints, whereby when the dirigible wheels are turned to dispose the spreader at an angle to the line of travel of the prime mover the angles through the two universal joints are approximately equal.

2. The combination of claim 1 in which the ends of the container are at the front and rear of the spreader and the wheels flank the side walls to the rear of the transverse median plane of the container.

References Cited by the Examiner
UNITED STATES PATENTS

| | | | |
|---|---|---|---|
| 1,698,724 | 1/1929 | Johnson et al. | 172—77 |
| 2,510,525 | 6/1950 | Smart et al. | 280—443 |
| 2,690,916 | 10/1954 | Gilliam | 180—79.2 X |
| 2,864,340 | 12/1958 | Hruska | 180—79.2 X |
| 3,004,765 | 10/1961 | Wilkes | 275—3 |
| 3,010,726 | 11/1961 | Smoker et al. | 275—4 |

ABRAHAM G. STONE, *Primary Examiner.*

J. R. OAKS, *Assistant Examiner.*